(12) United States Patent
Tagaya et al.

(10) Patent No.: US 11,384,955 B2
(45) Date of Patent: Jul. 12, 2022

(54) INDOOR UNIT FOR AIR-CONDITIONING APPARATUS, AND AIR-CONDITIONING APPARATUS

(71) Applicant: Mitsubishi Electric Corporation, Tokyo (JP)

(72) Inventors: Jun Tagaya, Tokyo (JP); Tetsuya Tazawa, Tokyo (JP); Keisuke Tomomura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 544 days.

(21) Appl. No.: 16/461,406

(22) PCT Filed: Feb. 1, 2017

(86) PCT No.: PCT/JP2017/003604
§ 371 (c)(1),
(2) Date: May 16, 2019

(87) PCT Pub. No.: WO2018/142508
PCT Pub. Date: Aug. 9, 2018

(65) Prior Publication Data
US 2019/0346171 A1 Nov. 14, 2019

(51) Int. Cl.
*B01D 39/00* (2006.01)
*F24F 13/02* (2006.01)
(Continued)

(52) U.S. Cl.
CPC ........ *F24F 13/0245* (2013.01); *F24F 13/082* (2013.01); *F24F 13/28* (2013.01); *B01D 46/10* (2013.01); *F24F 2005/0082* (2013.01)

(58) Field of Classification Search
CPC ...... F24F 13/0245; F24F 13/082; F24F 13/28; F24F 2005/0082; F24F 2221/14; F24F 1/0073; B01D 46/10
See application file for complete search history.

(56) References Cited

U.S. PATENT DOCUMENTS 6,174,340 B1  1/2001  Hodge
6,447,389 B1  9/2002  Kuo
(Continued)

FOREIGN PATENT DOCUMENTS

CN  101149170 A  3/2008
FR  2249571 A5   5/1975
(Continued)

OTHER PUBLICATIONS

Indian Examination Report dated Mar. 16, 2021, issued in corresponding Indian Patent Application No. 201947027827 (and English Machine Translation).

(Continued)

*Primary Examiner* — Dung H Bui
(74) *Attorney, Agent, or Firm* — Posz Law Group, PLC

(57) ABSTRACT

An indoor unit for an air-conditioning apparatus includes a body having an opening, a decorative panel attached to the body to cover the opening, and a filter disposed between the body and the decorative panel. The decorative panel has a rectangular air inlet grille disposed at a location that faces the opening of the body. The air inlet grille has long-side wall portions that face each other, a plurality of short-side wall portions disposed perpendicularly to each of the long-side wall portions, a bottom portion surrounded by the long-side wall portions and the plurality of short-side wall portions, and hook receiving portions located in respective grille corner portions each located at the corresponding one of four corners of the bottom portion. The filter is formed in a rectangular shape and has hook portions in respective filter corner portions each located at the corresponding one of four corners of the filter. The hook portions are engaged with the respective hook receiving portions.

9 Claims, 4 Drawing Sheets

(51) Int. Cl.
*F24F 13/08* (2006.01)
*F24F 13/28* (2006.01)
*F24F 5/00* (2006.01)
*B01D 46/10* (2006.01)

(56) References Cited

U.S. PATENT DOCUMENTS

| | | | |
|---|---|---|---|
| 6,488,578 B1 * | 12/2002 | Kuo | F24F 13/072 |
| | | | 454/248 |
| 6,526,773 B1 * | 3/2003 | Cho | F24F 13/085 |
| | | | 62/262 |
| 2009/0077987 A1 * | 3/2009 | Egawa | F24F 13/082 |
| | | | 62/259.1 |
| 2015/0211756 A1 | 7/2015 | Jeong | |
| 2016/0052095 A1 | 2/2016 | Simmons | |

FOREIGN PATENT DOCUMENTS

| | | |
|---|---|---|
| JP | H03-221740 A | 9/1991 |
| JP | H05-141689 A | 6/1993 |
| JP | H08-233350 A | 9/1996 |
| JP | H09-196460 A | 7/1997 |
| JP | 2001-227771 A | 8/2001 |

OTHER PUBLICATIONS

International Search Report of the International Searching Authority dated Apr. 25, 2017 for the corresponding International application No. PCT/JP2017/003604 (and English translation).

\* cited by examiner

INDOOR UNIT FOR AIR-CONDITIONING APPARATUS, AND AIR-CONDITIONING APPARATUS

CROSS REFERENCE TO RELATED APPLICATION

This application is a U.S. national stage application of PCT/JP2017/003604 filed on Feb. 1, 2017, the contents of which are incorporated herein by reference.

TECHNICAL FIELD

The present invention relates to an indoor unit for an air-conditioning apparatus, and an air-conditioning apparatus and, more particularly, to an air inlet grille and a filter that are used in an indoor unit for an air-conditioning apparatus.

BACKGROUND ART

There has been an indoor unit for an air-conditioning apparatus, in which a filter is attached to an air inlet grille by causing hook portions of the filter to be engaged with hook receiving portions of the air inlet grille (see, for example, Patent Literature 1).

CITATION LIST

Patent Literature

Patent Literature 1: Japanese Unexamined Patent Application Publication No. 09-196460

SUMMARY OF INVENTION

Technical Problem

In an existing indoor unit, hook portions are disposed at the periphery of a filter, and hook receiving portions are disposed on the inner back face of an air inlet grille. However, when the filter is attached to the air inlet grille, it is sometimes difficult to set the position of the filter to the air inlet grille.

The present invention is made to solve the above-described problem, and provides an indoor unit for an air-conditioning apparatus, and an air-conditioning apparatus that make it easy to set the position of a filter to an air inlet grille when the filter is attached to the air inlet grille.

Solution to Problem

An indoor unit for an air-conditioning apparatus according to an embodiment of the present invention includes a body, a decorative panel, and a filter. The body has an opening. The decorative panel is attached to the body to cover the opening. The filter is disposed between the body and the decorative panel. The decorative panel has an air inlet grille formed in a rectangular shape disposed at a location that faces the opening of the body. The air inlet grille has long-side wall portions that face each other, a plurality of short-side wall portions, a bottom portion, and hook receiving portions. The plurality of short-side wall portions are disposed perpendicularly to each of the long-side wall portions. The bottom portion is surrounded by the long-side wall portions and the plurality of short-side wall portions. The hook receiving portions are located in respective grille corner portions each located at the corresponding one of four corners of the bottom portion. The filter is formed in a rectangular shape. The filter has hook portions in respective filter corner portions each located at the corresponding one of four corners of the filter, and the hook portions are engaged with the respective hook receiving portions.

Advantageous Effects of Invention

In the indoor unit for an air-conditioning apparatus according to an embodiment of the present invention, the air inlet grille has the hook receiving portions located in the respective grille corner portions each located at the corresponding one of four corners of the bottom portion, the filter has the hook portions in the respective filter corner portions each located at the corresponding one of four corners of the filter, and the hook portions are engaged with the respective hook receiving portions. As a result, a position of the filter is easily set when the filter is attached, and thus the filter is quickly and easily attached to the air inlet grille. Consequently, workability when the filter is attached to the air inlet grille is improved.

DESCRIPTION OF EMBODIMENTS

Figure 1:
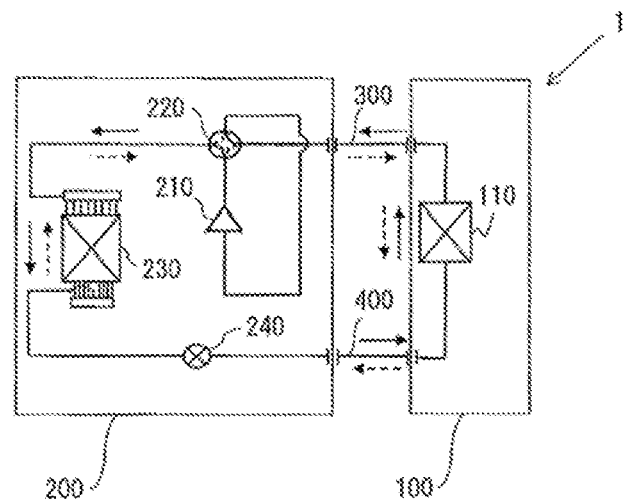
FIG. 1 is a diagram illustrating an example of the configuration of an air-conditioning apparatus according to Embodiment 1 of the present invention.

Hereinafter, an indoor unit for an air-conditioning apparatus, and an air-conditioning apparatus according to Embodiment of the present invention will be described with reference to, for example, the drawings. In the drawings described hereinafter, the same reference signs denote the same or corresponding elements, and this note applies to the full text of the following description of Embodiment. The modes of elements described in the full text of the specification are only illustrative, and modes of elements are not limited to the modes described in the specification. In the drawings, the relations of dimensions among elements can be different from the actual ones. In Embodiment, for easy understanding, terms that represent directions (for example, "upper", "lower", "right", "left", "front", "rear", and others) are used where appropriate; however, these terms are intended for illustration, and the present invention is not limited to these terms.

Embodiment 1

[Air-Conditioning Apparatus]

FIG. 1 is a diagram illustrating an example of the configuration of an air-conditioning apparatus according to Embodiment 1 of the present invention. FIG. 1 illustrates an air-conditioning apparatus 1 as an example of a refrigeration cycle device. The air-conditioning apparatus 1 of FIG. 1 includes an outdoor unit 200 and an indoor unit 100. The outdoor unit 200 and the indoor unit 100 are connected by a gas refrigerant pipe 300 and a liquid refrigerant pipe 400.

The outdoor unit 200 includes a compressor 210, a flow switching device 220, an outdoor heat exchanger 230, and an expansion valve 240. The compressor 210 compresses refrigerant sucked, and discharges the refrigerant. The flow switching device 220 is, for example, a four-way valve, and switches the flowing directions of refrigerant. The air-conditioning apparatus 1 switches operations between cooling operation and heating operation by switching the flowing directions of refrigerant. The outdoor heat exchanger 230 exchanges heat between refrigerant and air (outdoor air). The outdoor heat exchanger 230 acts as an evaporator during heating operation, and evaporates refrigerant into a gas phase. The outdoor heat exchanger 230 also acts as a condenser during cooling operation, and condenses refrigerant into a liquid phase. The expansion valve 240 is an expansion device (flow rate control unit). The expansion valve 240 acts as an expansion valve by adjusting the flow rate of refrigerant flowing through the expansion valve 240. The expansion valve 240 reduces the pressure of refrigerant flowing into the expansion valve 240. For example, when the expansion valve 240 is an electronic expansion valve or any of other similar types, the expansion valve 240 adjusts its opening degree in accordance with an instruction of a controller (not shown) or any of other similar devices.

The indoor unit 100 includes an indoor heat exchanger 110. The indoor heat exchanger 110 exchanges heat between refrigerant and air to be conditioned. The indoor heat exchanger 110 acts as a condenser during heating operation, and condenses refrigerant into a liquid phase. The indoor heat exchanger 110 also acts as an evaporator during cooling operation, and evaporates refrigerant into a gas phase.

[Configuration of Indoor Unit]

Figure 2:
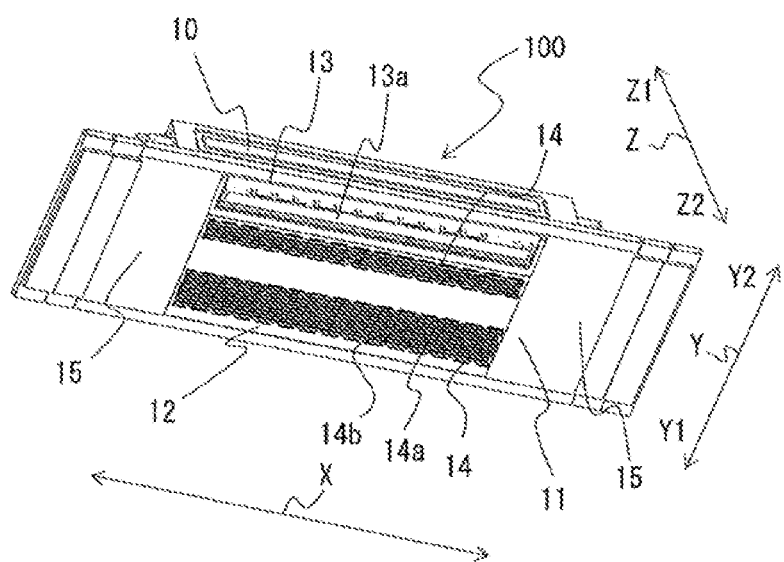
FIG. 2 is a perspective view illustrating an indoor unit of the air-conditioning apparatus according to Embodiment 1 of the present invention.

FIG. 2 is a perspective view illustrating the indoor unit of the air-conditioning apparatus according to Embodiment 1 of the present invention. In FIG. 2, the X-axis represents the longitudinal direction of the indoor unit 100, the Y-axis represents the transverse direction of the indoor unit 100, and the Z-axis represents the height direction of the indoor unit 100. In the Z-axis, Z1 represents an upward direction or a direction toward a ceiling, and Z2 represents a downward direction or a direction toward an indoor space.

The indoor unit 100 includes a body 10, a decorative panel 11, and filters 30 (described later). The above-described indoor heat exchanger 110 is accommodated in the body 10. The body 10 has an opening (not shown) at its lower face. The decorative panel 11 is attached to the body 10 to cover the opening. The filters 30 are disposed between the body 10 and the decorative panel 11. The indoor unit 100 illustrated in FIG. 2 is a ceiling concealed indoor unit in which the decorative panel 11 is exposed from a ceiling board and the body 10 is installed behind the ceiling board. The indoor unit 100 is not limited to a ceiling concealed indoor unit and may be a wall-mounted indoor unit or a floor-mounted indoor unit.

[Decorative Panel]

The decorative panel 11 is made of a synthetic resin material and is formed in a rectangular shape in plan view. The longitudinal direction (X-axis direction), transverse direction (Y-axis direction), and height direction (Z-axis direction) of the decorative panel 11 respectively correspond to the longitudinal direction (X-axis direction), transverse direction (Y-axis direction), and height direction (Z-axis direction) of the above-described indoor unit 100. The decorative panel 11 has an air inlet grille 12 formed in a rectangular shape disposed at a location facing the opening of the body 10. As illustrated in FIG. 2, the air inlet grille 12 is disposed at the center portion of the decorative panel 11 in the longitudinal direction (X-axis direction). The decorative panel 11 has side panels 15 provided on both sides of the air inlet grille 12 in the longitudinal direction (X-axis direction). The decorative panel 11 has an air outlet 13 along the longitudinal direction (X-axis direction) of the decorative panel 11 at one side (Y2 side) of the decorative panel 11 in the transverse direction (Y-axis direction). The air outlet 13 is used to pass air discharged from the body 10. The location of the air outlet 13 is not limited to the one side (Y2 side) of the decorative panel 11 in the transverse direction. The air outlet 13 may be formed at the other side (Y1 side) of the decorative panel 11 in the transverse direction. Alternatively, the location of the air outlet 13 is not limited to any one of the sides of the decorative panel 11 in the transverse direction. The air outlet 13 may be formed at each of the sides (Y1 side and Y2 side) of the decorative panel 11 in the transverse direction. An air flow flap 13a is disposed at the location of the air outlet 13 of the decorative panel 11. The air flow flap 13a is used to change the direction of air that is discharged from the body 10.

[Air Inlet Grille]

Figure 3:
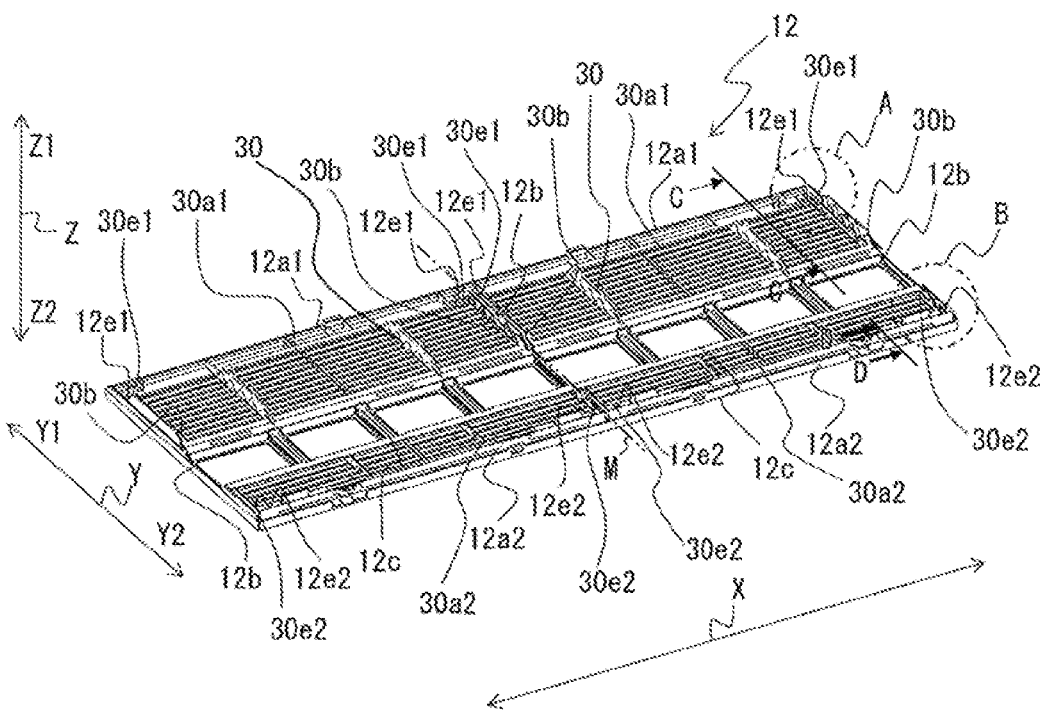
FIG. 3 is a perspective view of an air inlet grille and a filter that are used in the indoor unit of the air-conditioning apparatus according to Embodiment 1 of the present invention when viewed from an inside of a body of the indoor unit.

FIG. 3 is a perspective view of the air inlet grille and the filter that are used in the indoor unit of the air-conditioning apparatus according to Embodiment 1 of the present invention when viewed from an inside of the body of the indoor unit. The air inlet grille 12 will be described with reference to FIG. 2 and FIG. 3. The air inlet grille 12 has a front long-side wall portion 12a1, a rear long-side wall portion 12a2, and a plurality of short-side wall portions 12b. The front long-side wall portion 12a1 and the rear long-side wall portion 12a2 face each other. The plurality of short-side wall portions 12b are disposed perpendicularly to each of the front long-side wall portion 12a1 and the rear long-side wall portion 12a2. The air inlet grille 12 also has bottom portions 12c, and front hook receiving portions 12f and rear hook receiving portions 12j (described later). The bottom portions 12c are each surrounded by the front long-side wall portion 12a1, the rear long-side wall portion 12a2, and the short-side wall portions 12b. The front hook receiving portions 12f (described later) are located in respective grille corner portions 12e1 and the rear hook receiving portions 12j (described later) are located in respective grille corner portions 12e2, and the grille corner portions 12e1 and the grille corner portions 12e2 are located at the respective four corners of each of the bottom portions 12c. The rear long-side wall portion 12a2 forms a wall close to the air outlet 13 (Y2 side) in the air inlet grille 12. The front long-side wall portion 12a1 forms a wall opposite to the air outlet 13 (Y1 side). The air inlet grille 12 is formed in a rectangular shape in plan view. The longitudinal direction of the air inlet grille 12 is the same as the longitudinal direction (X-axis direction) of the decorative panel 11. That is, the longitudinal direction (X-axis direction), transverse direction (Y-axis direction), and height direction (Z-axis direction) of the air inlet grille 12 respectively correspond to the longitudinal direction (X-axis direction), transverse direction (Y-axis direction), and height direction (Z-axis direction) of the indoor unit 100. The front long-side wall portion 12a1 and the rear long-side wall portion 12a2 correspond to the long-side wall portions of the present invention. The grille corner portions 12e1 and the grille corner portions 12e2 correspond to the grille corner portions of the present invention. The front hook receiving portions 12f and the rear hook receiving portions 12j correspond to the hook receiving portions of the present invention.

As illustrated in FIG. 2, an air inlet 14 is formed in the bottom portions 12c of the air inlet grille 12 along the longitudinal direction (X-axis direction). The air inlet 14 is a hole that extends through the air inlet grille 12 from a portion close to the body 10 (Z1 side) to a portion facing the indoor space (Z2 side). A plurality of parallel horizontal bars 14a and vertical bars 14b are provided inside the air inlet 14. The vertical bars 14b are perpendicular to the horizontal bars and connected to the horizontal bars. Indoor air is drawn into the body 10 through the air inlet 14 formed in the air inlet grille 12.

Figure 4:
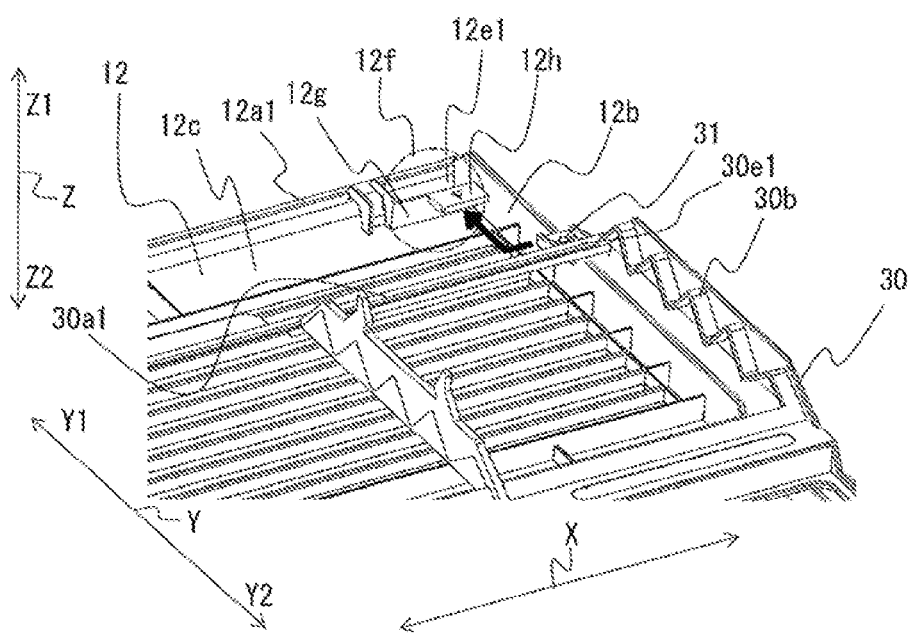
FIG. 4 is an enlarged view of portion A illustrated in FIG. 3.
Figure 5:
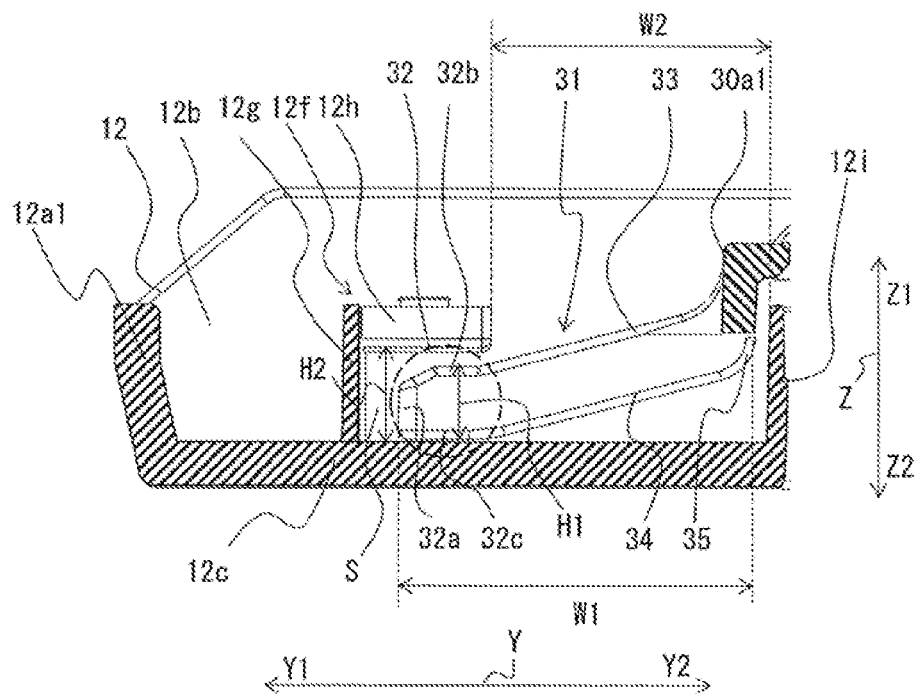
FIG. 5 is an enlarged sectional view of a portion taken along the line C-C in FIG. 3.

FIG. 4 is an enlarged view of portion A illustrated in FIG. 3. FIG. 5 is an enlarged sectional view of a portion taken along the line C-C in FIG. 3. The front hook receiving portions 12f are disposed on each of the bottom portions 12c along the front long-side wall portion 12a1 that is one of the long-side wall portions of the air inlet grille 12. The front hook receiving portions 12f each have a front contact wall 12g and a front projecting portion 12h. The front contact wall 12g is a plate-shaped wall extending upward from the bottom portion 12c, and is provided to extend in the longitudinal direction (X-axis direction) of the air inlet grille 12. The front projecting portion 12h formed in a plate shape projects from the upper end of the front contact wall 12g toward the rear long-side wall portion 12a2 and faces the bottom portion 12c. As illustrated in FIG. 4, the front projecting portion 12h is formed in a rectangular shape. As illustrated in FIG. 5, the air inlet grille 12 has space S surrounded by the bottom portion 12c, the front contact wall 12g, and the front projecting portion 12h. As illustrated in FIG. 5, the air inlet grille 12 further has a retaining rib 12i at a portion across from the front long-side wall portion 12a1. The retaining rib 12i extends upward from the bottom portion 12c to face the front contact wall 12g.

Figure 6:
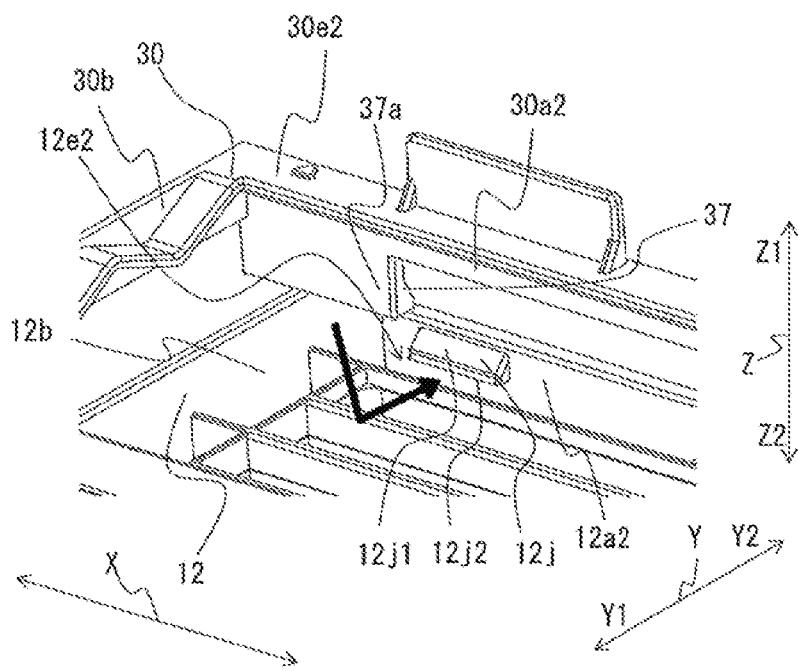
FIG. 6 is an enlarged view of portion B illustrated in FIG. 3.
Figure 7:
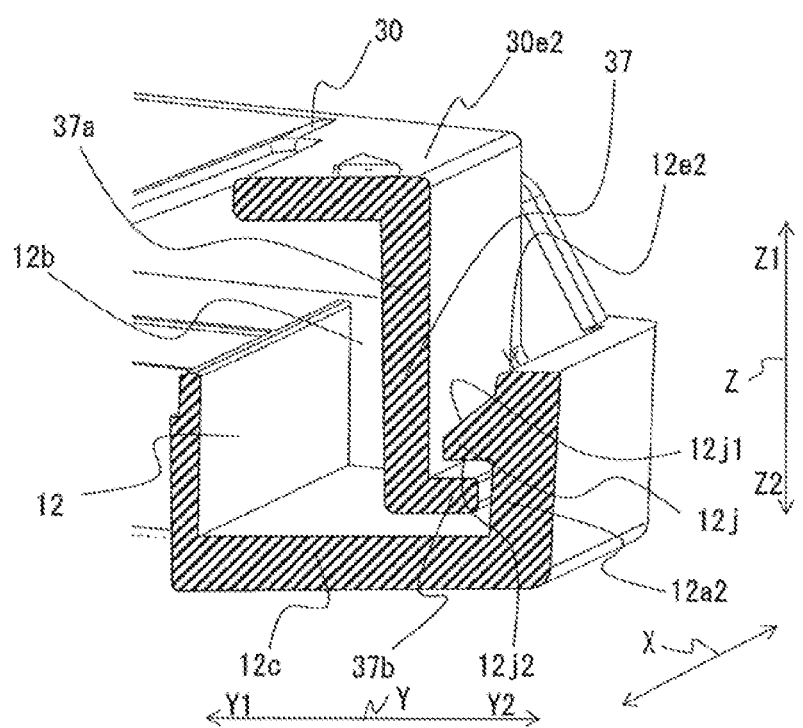
FIG. 7 is an enlarged sectional view of a portion taken along the line D-D in FIG. 3.

FIG. 6 is an enlarged view of portion B illustrated in FIG. 3. FIG. 7 is an enlarged sectional view of a portion taken along the line D-D in FIG. 3. As illustrated in FIG. 6, the rear hook receiving portion 12j is disposed on the rear long-side wall portion 12a2 that is the other one of the long-side wall portions of the air inlet grille 12. The rear hook receiving portion 12j projects from the rear long-side wall portion 12a2, and is provided to extend in the longitudinal direction (X-axis direction) of the air inlet grille 12. The rear hook receiving portion 12j has an inclined wall portion 12j1 and a bottom wall portion 12j2. As illustrated in FIG. 7, in the section of the rear long-side wall portion 12a2, the inclined wall portion 12j1 has an inclined surface toward an inside of the body 10 in such a manner that the width increases in the inclined wall portion 12j1 from the upper portion of the rear hook receiving portion 12j toward the lower portion of the rear hook receiving portion 12j. The bottom wall portion 12j2 is a surface facing each of the bottom portions 12c.

[Filter]

Next, the filters 30 will be described with reference to FIG. 3 to FIG. 7. In FIG. 4 and FIG. 6, to illustrate the configuration of the air inlet grille 12, the filters 30 are separated from the air inlet grille 12. The filters 30 are each made of a synthetic resin material and each remove dust contained in air that is sucked into the body 10. As illustrated in FIG. 3, the air inlet grille 12 has portions across one of the short-side wall portions 12b provided at a middle portion M of the air inlet grille 12, and the filter 30 is attached on each of the portions. The filters 30 are mounted to cover the air inlet 14 illustrated in FIG. 2 from the inside of the body 10. The filters 30 are each formed in a rectangular shape and each have a front long-side frame portion 30a1 and a rear long-side frame portion 30a2 that face each other and short-side frame portions 30b that face each other. The filters 30 each have front hook portions 31 (described later) located in respective filter corner portions 30e1 and rear hook portions 37 (described later) located in respective filter corner portions 30e2, and the filter corner portions 30e1 and the filter corner portions 30e2 are located at respective four corners of the filter 30. The front hook portions 31 and the rear hook portions 37 are engaged with the respective hook receiving portions. The longitudinal direction (X-axis direction), transverse direction (Y-axis direction), and height direction (Z-axis direction) of each of the filters 30 respectively correspond to the longitudinal direction (X-axis direction), transverse direction (Y-axis direction), and height direction (Z-axis direction) of the above-described indoor unit 100. The front long-side frame portions 30a1 and the rear long-side frame portions 30a2 correspond to the long-side frame portions of the present invention. The front hook portions 31 and the rear hook portions 37 correspond to the hook portions of the present invention.

As illustrated in FIG. 4, the front hook portion 31 is formed to project obliquely downward in the transverse direction of the filters 30 from the filter corner portion 30e1 located at each end of each of the front long-side frame portions 30a1 that is one of the corresponding one of the long-side frame portions. As illustrated in FIG. 5, the front hook portions 31 each have a curved portion 32 the distal end of which curves, a first flat plate 33, and a second flat plate 34. The curved portion 32 is located at the distal end of the front hook portion 31 and curves in a top-and-bottom direction into a U-shape. The curved portion 32 has elasticity. The curved portion 32 has an upper wall portion 32b, a lower wall portion 32c, and a front wall portion 32a. The front wall portion 32a is the most distal end of the front hook portion 31 and connects the upper wall portion 32b to the lower wall portion 32c. The first flat plate 33 is a narrow long plate-shaped portion provided to be inclined between the upper wall portion 32b forming one end of the curved portion 32 and the front long-side frame portion 30a1. The second flat plate 34 is a narrow long plate-shaped portion provided to be connected with the lower wall portion 32c forming the other end of the curved portion 32 and is inclined in the same direction as a direction in which the first flat plate 33 is inclined. The curved portion 32 is formed to have a distance H1 between the outer surfaces of the upper wall portion 32b and lower wall portion 32c that is less than a distance H2 between the front projecting portion 12h and the bottom portion 12c. The front hook portion 31 is formed to have a distance W1 between the front wall portion 32a that is the most distal end portion of the front hook portion 31 and a proximal end portion 35 of the second flat plate that is greater than a distance W2 between the front projecting portion 12h and the retaining rib 12i.

As illustrated in FIG. 3 and FIG. 6, the rear hook portion 37 is formed to project downward from the filter corner portion 30e2 located at each end of each of the rear long-side frame portions 30a2 that is the other one of the corresponding one of the long-side frame portions. As illustrated in FIG. 6 and FIG. 7, the rear hook portions 37 each have a downward wall portion 37a and an outer edge projecting portion 37b. The downward wall portion 37a projects downward. The outer edge projecting portion 37b projects from the lower end of the downward wall portion 37a in the transverse direction toward the outer edge of each of the filters 30.

Next, attaching of the filters 30 to the air inlet grille 12 will be described with reference to FIG. 4 and FIG. 6. When each of the filters 30 is attached to the air inlet grille 12, first, the front hook portions 31 of the filter 30 are each brought into contact with the corresponding one of the short-side wall portions 12b of the air inlet grille 12 in such a manner that the short-side frame portions 30b of the filter 30 each face the corresponding one of the short-side wall portions 12b of the air inlet grille 12. Subsequently, the front hook portions 31 are each inserted into the corresponding one of the spaces S in such a manner that the front hook portion 31 contacts with the front contact wall 12g of the corresponding one of the front hook receiving portions 12f. Once the front hook portion 31 is inserted in the space S, the upper wall portion 32b of the curved portion 32 faces the front projecting portion 12h of the front hook receiving portion 12f, and the front hook portion 31 is engaged with the front hook receiving portion 12f. As represented by the arrow in FIG. 4, when the front hook portion 31 of one of the filters 30 is inserted below the front projecting portion 12h of the air inlet grille 12, the front hook portion 31 is inserted from the obliquely upper side (from the upper right side in FIG. 4). When the front hook portion 31 is inserted in this manner, the distal end of the front hook portion 31 of the filter 30 is more easily inserted between the front projecting portion 12h and bottom portion 12c of the air inlet grille 12. When the front hook portion 31 is inserted in the space S, movement of the proximal end portion 35 of the filter 30 in the transverse direction of the filter 30 is restricted by the retaining rib 12i. Thus, the front hook portion 31 does not move in a direction to come off from the front hook receiving portion 12f (rightward direction in the drawing), and the filter 30 is prevented from coming off from the air inlet grille 12.

Subsequently, the rear hook portions 37 of the filter 30 are each brought into contact with the corresponding one of the short-side wall portions 12b of the air inlet grille 12 in such a manner that the corresponding one of the short-side frame portions 30b of the filter 30 faces the short-side wall portion 12b of the air inlet grille 12. Then, the outer edge projecting portion 37b of the rear hook portion 37 is placed under the rear hook receiving portion 12j in such a manner that the outer edge projecting portion 37b contacts with the rear long-side wall portion 12a2. When the outer edge projecting portion 37b is placed under the rear hook receiving portion 12j, the outer edge projecting portion 37b faces the bottom wall portion 12j2 of the rear hook receiving portion 12j, and the rear hook portion 37 is engaged with the rear hook receiving portion 12j. The rear hook receiving portion 12j has the inclined wall portion 12j1. With the use of the inclined surface of the inclined wall portion 12j1, the outer edge projecting portion 37b is more easily placed under the rear hook receiving portion 12j.

Each of the filters 30 is fixed and attached to the air inlet grille 12 when the front hook portions 31 are engaged with the front hook receiving portions 12f and the rear hook portions 37 are engaged with the rear hook receiving portions 12j.

As described above, in the indoor unit 100, the air inlet grille has the hook receiving portions located in the respective grille corner portions each located at the corresponding one of the four corners of each of the bottom portions, the filter has hook portions in the respective filter corner portions each located at the corresponding one of the four corners of each of the filters, and the hook portions are engaged with the respective hook receiving portions. As a result, the position of the filter is easily set when the filter is attached, and thus the filter is quickly and easily attached to the air inlet grille. Consequently, workability when the filter is attached to the air inlet grille is improved.

The filter may warp because of a temperature change or any of other causes during molding, and air containing dust that does not pass through the filter may be introduced into the indoor heat exchanger. In such a case, the indoor heat exchanger gets dusty, and the performance of the indoor unit decreases. In the indoor unit 100, the air inlet grille has the hook receiving portions located in the respective grille corner portions each located at the corresponding one of the four corners of each of the bottom portions, the filters each have the hook portions in the respective filter corner portions each located at the corresponding one of the four corners of the filter, and the hook portions are engaged with the respective hook receiving portions. As a result, a warpage of the filter is corrected as a result of the corners of the filter being held, and indoor air that passes through the air inlet grille is caused to pass through the filter without any leakage.

The hook receiving portions include the front hook receiving portions disposed on the bottom portions along the front long-side wall portions. The front hook receiving portions each have the plate-shaped front contact wall extending upward from the bottom portion and the plate-shaped front projecting portion projecting from the upper end of the contact wall toward the other one of the long-side wall portions and facing the bottom portion. As a result, the position of the filter is easily set when the filter is attached, and the filter is quickly and easily attached to the air inlet grille. Consequently, workability when the filter is attached to the air inlet grille is improved. In addition, the front hook portions are engaged with the front hook receiving portions, and thus the filter is prevented from unintentionally coming off from the air inlet grille.

The hook receiving portions include the rear hook receiving portions disposed on the rear long-side wall portions. The rear hook receiving portions each have the inclined wall portion toward the inside of the body and having an inclined surface and projects from the rear long-side wall portion. In a process of attaching the filter to the air inlet grille, the outer edge projecting portion is more easily placed under the rear hook receiving portion by pushing the rear hook portion with the use of the inclined surface of the inclined wall portion. As a result, the filter is quickly and easily attached to the air inlet grille, and thus workability when the filter is attached to the air inlet grille is improved. The rear hook receiving portions each have the bottom wall portion having a surface that faces the bottom portion, and projects from the rear long-side wall portion. With such configuration, the rear hook portions are engaged with the rear hook receiving portions, and thus the filter is prevented from unintentionally coming off from the air inlet grille.

The front hook portion is formed to project obliquely downward in the transverse direction of the filter from each end of each of the front long-side frame portions that is one of the corresponding one of the long-side frame portions. Consequently, the front hook portion is easily inserted into the space S, and the filter is quickly and easily attached to the air inlet grille.

The front hook portions each have the curved portion, the first flat plate, and the second flat plate. The curved portion is located at the distal end of the front hook portion, and the distal end of the curved portion curves. The first flat plate is formed in a narrow long plate shape and is provided to be inclined between one end of the curved portion and the front long-side frame portion. The second flat plate is connected with the other end of the curved portion and is inclined in the same direction as the direction in which the first flat plate is inclined. Consequently, the front hook portion has elasticity. With the use of the elasticity of the front hook portion, the front hook portion is more easily inserted into the space S. Hence, the filter is quickly and easily attached to the air inlet grille. After the hook portion is engaged with the hook receiving portion, the front hook portion recovers in shape and is unlikely to come off from the hook receiving portion.

The curved portions each have the upper wall portion and the lower wall portion, and is formed to have the distance H1 between the outer surfaces of the upper wall portion and lower wall portion that is less than the distance H2 between the front projecting portion and the bottom portion. As a result, the hook portion is more easily inserted into the hook receiving portion when the filter is attached, and thus the filter is quickly and easily attached to the air inlet grille. Consequently, workability when the filter is attached to the air inlet grille is improved.

The air inlet grille further has the retaining ribs each extending upward from the bottom portion to face the front contact wall, and the front hook portions are each formed to have the distance W1 between the most distal end portion of the front hook portion and the proximal end portion of the second flat plate that is greater than the distance W2 between the front projecting portion and the retaining rib. Consequently, when the front hook portion is inserted in the space S, movement of the proximal end portion of the filter in the transverse direction of the filter is restricted by the retaining rib. As a result, the front hook portion does not move in a direction to come off from the front hook receiving portion (rightward direction in FIG. 5), and the filter is prevented from unintentionally coming off from the air inlet grille.

The rear hook portion is formed to project downward from the filter corner portion located at each end of each of the rear long-side frame portions. Consequently, after the front hook portion is attached to the air inlet grille in the oblique direction, the filter is easily attached to the air inlet grille by pushing the filter downward.

The rear hook portions each have the downward wall portion and the outer edge projecting portion. The downward wall portion projects downward, and the outer edge projecting portion projects in the transverse direction from the lower end portion of the downward wall portion toward the outer edge of the filter. Consequently, the rear hook portion is engaged with the rear hook receiving portion, and the filter is prevented from unintentionally coming off from the air inlet grille.

The embodiments of the present invention are not limited to Embodiment 1. Various modifications may be added. For example, in FIG. 4, the front projecting portion 12h is formed in a rectangular shape; however, the shape of the front projecting portion 12h is not limited to a rectangular shape. The front projecting portion 12h only needs to project from the upper end of the front contact wall 12g toward the rear long-side wall portion 12a2. For example, the front projecting portion 12h may be formed in a polygonal columnar shape having a bottom that faces the bottom portion 12c. Alternatively, the front projecting portion 12h may be formed in a semicircular columnar shape having a bottom that faces the bottom portion 12c. In FIG. 3, two filters 30 are attached to the air inlet grille; however, the number of filters 30 that are used in the indoor unit 100 is not limited to two. The number of filters 30 that are attached to the air inlet grille 12 only needs to match the number of grille corner portions formed. For example, the number of the filters 30 may be two or more or may be one.

REFERENCE SIGNS LIST 1 air-conditioning apparatus 10 body 11 decorative panel 12 air inlet grille 12a1 front long-side wall portion 12a2 rear long-side wall portion 12b short-side wall portion 12c bottom portion 12e1 grille corner portion 12e2 grille corner portion 12f front hook receiving portion 12g front contact wall 12h front projecting portion 12i retaining rib 12j rear hook receiving portion 12j1 inclined wall portion 12j2 bottom wall portion 13 air outlet 13a air flow flap air inlet 14a horizontal bar 14b vertical bar 15 side panel 30 filter 30a1 front long-side frame portion 30a2 rear long-side frame portion 30b short-side frame portion 30e1 filter corner portion 30e2 filter corner portion 31 front hook portion 32 curved portion 32a front wall portion 32b upper wall portion 32c lower wall portion 33 first flat plate 34 second flat plate 35 proximal end portion 37 rear hook portion 37a downward wall portion 37b outer edge projecting portion 100 indoor unit 110 indoor heat exchanger 200 outdoor unit 210 compressor 220 flow switching device 230 outdoor heat exchanger 240 expansion valve 300 gas refrigerant pipe 400 liquid refrigerant pipe

The invention claimed is:

1. An air-conditioning apparatus comprising an indoor unit, the indoor unit comprising:
a body having an opening;
a decorative panel attached to the body to cover the opening; and
a filter disposed between the body and the decorative panel,
the decorative panel having an air inlet grille formed in a rectangular shape disposed at a location that faces the opening of the body,
the air inlet grille having long-side wall portions that face each other, a plurality of short-side wall portions, a bottom portion, and hook receiving portions, the plurality of short-side wall portions being disposed perpendicularly to each of the long-side wall portions, the bottom portion being surrounded by the long-side wall portions and the plurality of short-side wall portions, the hook receiving portions being located in respective grille corner portions each located at a corresponding one of four corners of the bottom portion,
the hook receiving portions including front hook receiving portions disposed on the bottom portion along a front long-side wall portion that is one of the long-side wall portions of the air inlet grille,
the front hook receiving portions each having a front contact wall formed in a plate shape and a front projecting portion formed in a plate shape, the front contact wall extending upward from the bottom portion, the front projecting portion projecting from an upper end of the front contact wall toward an other one of the long-side wall portions and facing the bottom portion,
the filter being formed in a rectangular shape and having hook portions in respective filter corner portions each located at a corresponding one of four corners of the filter, the hook portions being engaged with the respective hook receiving portions.

2. The air-conditioning apparatus of claim 1, wherein
the hook receiving portions include rear hook receiving portions disposed on a rear long-side wall portion that is the other one of the long-side wall portions of the air inlet grille, and
the rear hook receiving portions each have an inclined wall portion and a bottom wall portion, the inclined wall portion toward an inside of the body and having an inclined surface, the bottom wall portion having a surface facing the bottom portion, the rear hook receiving portions projecting from the rear long-side wall portion of the air inlet grille.

3. The air-conditioning apparatus of claim 1, wherein
the filter has long-side frame portions that face each other and short-side frame portions that face each other, and
the hook portions include a front hook portion formed to project obliquely downward in a transverse direction of the filter from each end of a front long-side frame portion that is one of the long-side frame portions.

4. The air-conditioning apparatus of claim 3, wherein the front hook portion has a curved portion, a first flat plate formed in a narrow long plate shape, and a second flat plate, the curved portion being located at a distal end of the front hook portion and whose distal end is curved, the first flat plate being provided and inclined between one end of the curved portion and the front long-side frame portion, the second flat plate being provided to be connected to an other end of the curved portion and inclined in a same direction as a direction in which the first flat plate is inclined.

5. The air-conditioning apparatus of claim 4, wherein the curved portion has an upper wall portion and a lower wall portion, and is formed to have a distance H1 between an outer surface of the upper wall portion and an outer surface of the lower wall portion that is less than a distance H2 between the front projecting portion and the bottom portion.

6. The air-conditioning apparatus of claim 5, wherein
the air inlet grille further has a retaining rib extending upward from the bottom portion to face the front contact wall, and
the front hook portion is formed to have a distance W1 between a most distal end portion of the front hook portion and a proximal end portion of the second flat plate that is greater than a distance W2 between the front projecting portion and the retaining rib.

7. The air-conditioning apparatus of claim 3, wherein the hook portions include a rear hook portion formed to project downward from a corresponding one of the filter corner portions located at each end of a rear long-side frame portion that is an other one of the long-side frame portions.

8. The air-conditioning apparatus of claim 7, wherein the rear hook portion has a downward wall portion projecting downward and an outer edge projecting portion projecting in the transverse direction from a lower end of the downward wall portion toward an outer edge of the filter.

9. The air-conditioning apparatus of claim 1, wherein the filter comprises a plurality of filters that are disposed on the air inlet grille.

* * * * *